US011146332B1

United States Patent
Yoshida et al.

(10) Patent No.: US 11,146,332 B1
(45) Date of Patent: Oct. 12, 2021

(54) TRANSMISSION LINE MONITORING DEVICE AND TRANSMISSION LINE MONITORING METHOD

(71) Applicant: FUJITSU LIMITED, Kawasaki (JP)

(72) Inventors: Setsuo Yoshida, Inagi (JP); Takahito Tanimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/153,625

(22) Filed: Jan. 20, 2021

(30) Foreign Application Priority Data

Mar. 27, 2020 (JP) .............................. JP2020-058441

(51) Int. Cl.
H04B 10/2513 (2013.01)
H04B 10/079 (2013.01)
H04B 10/61 (2013.01)

(52) U.S. Cl.
CPC ..... H04B 10/2513 (2013.01); H04B 10/0799 (2013.01); H04B 10/07951 (2013.01); H04B 10/07955 (2013.01); H04B 10/616 (2013.01)

(58) Field of Classification Search
None
See application file for complete search history.

(56) References Cited

U.S. PATENT DOCUMENTS

2010/0046961 A1 2/2010 Tanimura et al.
2011/0097075 A1 4/2011 Tanimura et al.
2018/0234184 A1* 8/2018 Tanimura ........... H04B 10/6161

FOREIGN PATENT DOCUMENTS

JP 2010-050578 A 3/2010
JP 2011-089945 A 5/2011
JP 2018-133725 A 8/2018

OTHER PUBLICATIONS

Takahito Tanimura et al., "Semiblind Nonlinear Equalization in Coherent Multi-Span Transmission System with Inhomogeneous Span Parameters", Conference on Optical Fiber Communication (OFC/NFOEC), 2010 (3 pages).

* cited by examiner

Primary Examiner — David W Lambert
(74) Attorney, Agent, or Firm — Staas & Halsey LLP

(57) ABSTRACT

A monitoring device includes a processor configured to compensate an electric field signal generated from an optical signal alternately for a chromatic dispersion and a nonlinear distortion in the optical signal in each of virtual sections of a transmission line, evaluate a quality of a compensated electric field signal, select the virtual sections sequentially, set a first compensation quantity of the chromatic dispersion according to a length of each of the virtual sections, search for a third compensation quantity of the nonlinear distortion for a selected virtual section when the quality satisfies a predetermined condition under an assumption that no nonlinear distortion is produced in other virtual sections, search for a second compensation quantity of the nonlinear distortion by setting an initial value of the second compensation quantity to the third compensation quantity, and monitor a power distribution of the optical signal based on the first and second compensation quantities.

12 Claims, 9 Drawing Sheets

TRANSMISSION LINE MONITORING DEVICE AND TRANSMISSION LINE MONITORING METHOD

CROSS-REFERENCE TO RELATED APPLICATION

This application is based upon and claims the benefit of priority of the prior Japanese Patent Application No. 2020-058441, filed on Mar. 27, 2020, the entire contents of which are incorporated herein by reference.

FIELD

A certain aspect of embodiments described herein relates to a transmission line monitoring device and a transmission line monitoring method.

BACKGROUND

To meet the increased demand for transmission of large volumes of data, digital coherent optical transmission systems that allow the transmission at 100 (Gbps) or greater with a single-wavelength light have been researched and developed. The digital coherent optical transmission system uses the intensity and the phase of the light to modulate a signal. Examples of such a modulation system include 64 quadrature amplitude modulation (64QAM).

The receiver of the digital coherent optical transmission system digital-coherently receives an optical signal from a transmission line, converts the optical signal into electric field signals of polarization components of the optical signal, and compensates each electric field signal for, for example, the chromatic dispersion of the transmission line and the nonlinear distortion (deterioration due to the nonlinear optical effect of the transmission line).

As a transmission line for the optical signal, an optical fiber of, for example, tens of kilometers to thousands of kilometers extends between a transmitter and a receiver. To appropriately route the optical signal in the network, for example, monitoring results of the power distribution of the optical signal on the transmission line are used. As a method for monitoring the power distribution, a method that uses, for example, the compensation quantity of the chromatic dispersion and the compensation quantity of the nonlinear distortion is suggested as disclosed in, for example, Japanese Patent Application Publication No. 2018-133725. In addition, a technique for adjusting the compensation quantity of the chromatic dispersion and the compensation quantity of the nonlinear distortion in each section of the transmission line is suggested in T. Tanimura et al., "Semi-blind Nonlinear Equalization in Coherent Multi-Span Transmission System with Inhomogeneous Span Parameters", OFC 2010 (Non-Patent Document 1).

SUMMARY

According to an aspect of the embodiments, there is provided a transmission line monitoring device including: a memory; and a processor coupled to the memory and configured to: compensate an electric field signal alternately for a chromatic dispersion and a nonlinear distortion produced in an optical signal in each of virtual sections, the electric field signal indicating an optical electric field component of the optical signal input from a transmission line virtually divided into the virtual sections; evaluate a quality of the electric field signal that is compensated for the chromatic dispersion and the nonlinear distortion; set a first compensation quantity of the chromatic dispersion according to a length of each of the virtual sections to search for a second compensation quantity of the nonlinear distortion for each of the virtual sections when the quality satisfies a predetermined condition; and monitor a power distribution of the optical signal on the transmission line on a basis of a relationship between the first compensation quantity and the second compensation quantity, wherein the processor is further configured to, when searching for the second compensation quantity, select the virtual sections in sequence, set the first compensation quantity, and search for a third compensation quantity of the nonlinear distortion for a selected virtual section when the quality satisfies the predetermined condition under an assumption that no nonlinear distortion is produced in virtual sections other than the selected virtual section out of the virtual sections, and search for the second compensation quantity for each of the selected virtual section by setting an initial value of the second compensation quantity to the third compensation quantity.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Use of the technique disclosed in Non-Patent Document 1 enables to obtain the compensation quantity of the chromatic dispersion and the compensation quantity of the nonlinear distortion for each section of the transmission line. Therefore, the power distribution of the optical signal can be monitored on the basis of the relationship between the compensation quantity of the chromatic dispersion and the compensation quantity of the nonlinear distortion. However, for the compensation quantity of the nonlinear distortion, an optimum value for each section is searched for using an inaccurate value as an initial value according to the steepest descent method so that the signal quality is maximized.

This search is executed by solving the optimization problem including the same number of variables as the number of sections, and therefore there are many local optimum solutions. Therefore, use of the inaccurate initial value different from a true optimum value makes it difficult to monitor the power distribution of the optical signal precisely.

Exemplary Configuration of a Transmission System

Figure 1:
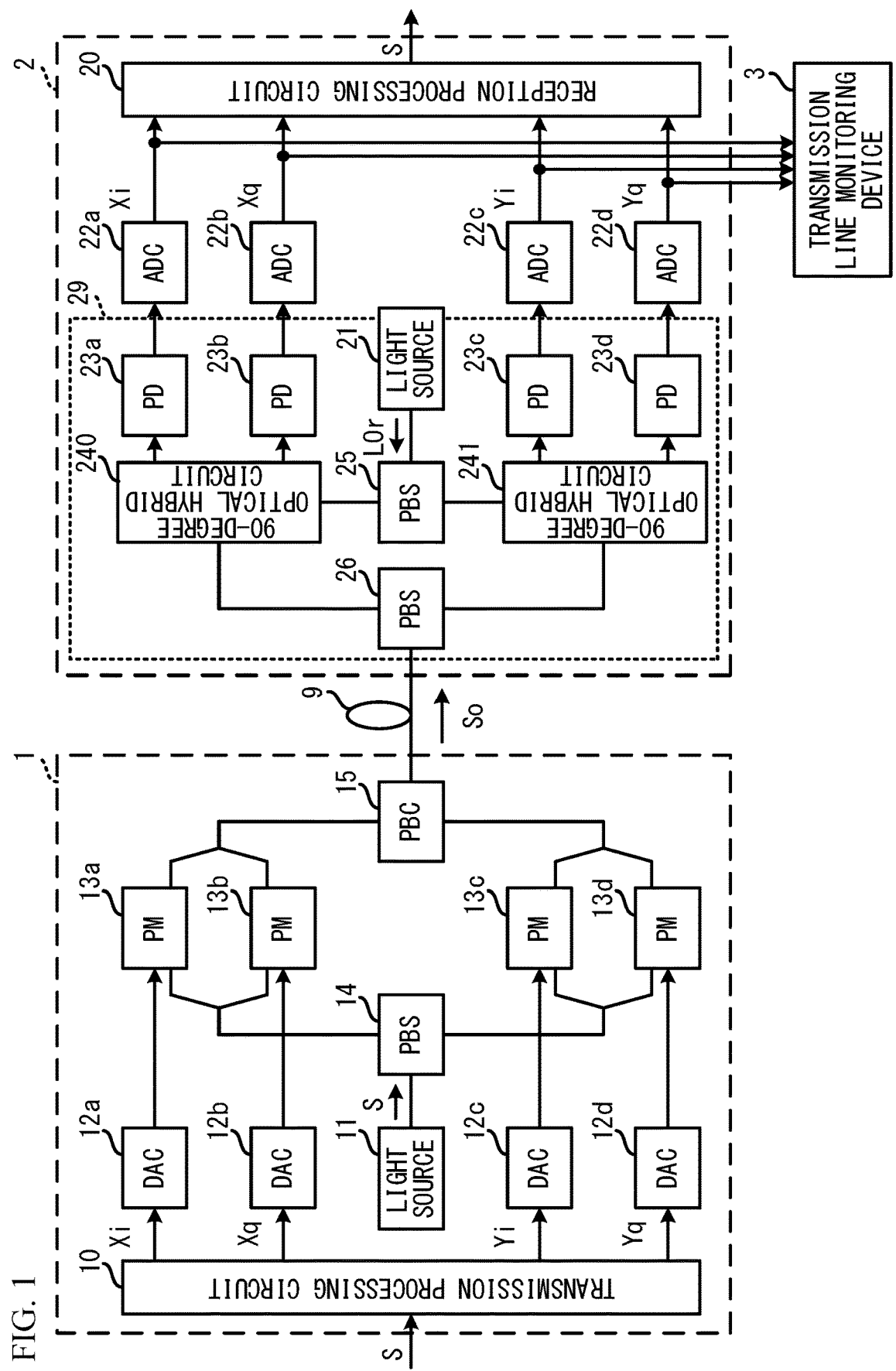
FIG. 1 is a block diagram illustrating an exemplary transmission system using a digital coherent optical transmission system.

FIG. 1 is a block diagram illustrating a transmission system using a digital coherent optical transmission system. The transmission system includes a transmitter 1 transmitting an optical signal So to a transmission line 9, a receiver 2 receiving the optical signal So through the transmission line 9, and a transmission line monitoring device 3 monitoring the power distribution of the optical signal So on the transmission line.

The transmitter 1 includes a transmission processing circuit 10, a light source 11, and digital-to-analog converters (DACs) 12a to 12d. The transmitter 1 also includes phase modulators (PMs) 13a to 13d, a polarization beam splitter (PBS) 14, and a polarization beam combiner (PBC) 15. The transmitter 1 generates the optical signal So that is the synthesized signal of the X-polarization wave and the Y-polarization wave, which are orthogonal to each other, from a data signal S such as an Ethernet (registered trademark) signal.

The transmission processing circuit 10 generates electric field signals Xi, Xq, Yi, and Yq by modulating the data signal S input from another device using a multi-value modulation method such as 64QAM, and outputs the generated electric field signals Xi, Xq, Yi, and Yq to the DACs 12a to 12d, respectively. Each of the electric field signals Xi, Xq, Yi, and Yq indicates the optical electric field component of the optical signal So. The electric field signals Xi and Xq are the I component and the Q component of the X-polarization wave of the optical signal So, respectively, while the electric field signals Yi and Yq are the I component and the Q component of the Y-polarization wave of the optical signal So, respectively. Examples of the transmission processing circuit 10 include, but are not limited to, a digital signal processor (DSP), a field programmable gate array (FPGA), and an application specific integrated circuit (ASIC).

The DACs 12a to 12d convert the electric field signals Xi, Xq, Yi, and Yq from digital signals to analog signals, respectively. The converted electric field signals Xi, Xq, Yi, and Yq are input to the PMs 13a to 13d, respectively. The DACs 12a to 12d may be incorporated in the transmission processing circuit 10.

The light source 11 is, for example, a laser diode (LD), and emits a light S having a predetermined frequency to the PBS 14. The PBS 14 splits the light S into X-axis and Y-axis (polarization axes) polarization components. The X polarization component of the light S is input to each of the PMs 13a and 13b, while the Y polarization component of the light S is input to each of the PMs 13c and 13d.

The PMs 13a to 13d optically modulate the light S using the electric field signals Xi, Xq, Yi, and Yq, which have been converted into analog signals, respectively. More specifically, the PMs 13a and 13b modulate the phase of the X-polarization wave of the light S using the electric field signals Xi and Xq, respectively, while the PMs 13c and 13d modulate the phase of the Y-polarization wave of the light S using the electric field signals Yi and Yq, respectively. The X polarization component and the Y polarization component of the phase-modulated light S are input to the PBC 15. The PBC 15 combines the X polarization component and the Y polarization component of the light S, and outputs the resulting light to the transmission line 9 as the optical signal So.

The receiver 2 includes a reception processing circuit 20, a front-end unit 29, and analog-to-digital convertors (ADCs) 22a to 22d. The front-end unit 29 includes a light source 21, photodiodes (PDs) 23a to 23d, 90-degree optical hybrid circuits 240 and 241, and PBSs 25 and 26. The front-end unit 29 digital-coherently receives the optical signal So from the transmission line 9. The PBS 26 splits the optical signal So input from the transmitter 1 via the transmission line 9 into the X polarization component and the Y polarization component that are then output to the 90-degree optical hybrid circuits 240 and 241, respectively.

The light source 21 inputs a local emission light LOr of the transmitter 1 to the PBS 25. The PBS 25 splits the local emission light LOr into the X polarization component and the Y polarization component that are then output to the 90-degree optical hybrid circuits 240 and 241, respectively.

The 90-degree optical hybrid circuit 240 detects the X polarization component of the optical signal So using the waveguide that causes the X polarization component of the optical signal So and the X polarization component of the local emission light LOr to interfere with each other. The 90-degree optical hybrid circuit 240 outputs optical electric field components corresponding to the amplitudes and the phases of an I channel and a Q channel to the PDs 23a and 23b, respectively, as a result of the detection.

The 90-degree optical hybrid circuit 241 detects the Y polarization component of the optical signal So using the waveguide that causes the Y polarization component of the optical signal So and the Y polarization component of the local emission light LOr to interfere with each other. The 90-degree optical hybrid circuit 241 outputs optical electric field components corresponding to the amplitudes and the phases of an I channel and a Q channel to the PDs 23c and 23d, respectively, as a result of the detection.

The PDs 23a to 23d convert the input optical electric field components into electric signals that are then output to the ADCs 22a to 22d, respectively. The ADCs 22a to 22d convert the electric signals input from the PDs 23a to 23d into the electric field signals Xi, Xq, Yi, and Yq, respectively. The electric field signals Xi, Xq, Yi, and Yq are input to the reception processing circuit 20.

The reception processing circuit 20 compensates the electric field signals Xi, Xq, Yi, and Yq for the waveform distortion of the optical signal So caused by the polarization mode dispersion and the polarization dependent loss in the transmission line 9 using dynamic parameters, and generates the data signal S from the electric field signals Xi, Xq, Yi, and Yq. Examples of the reception processing circuit 20 include, but are not limited to, a DSP, an FPGA, and an ASIC.

The electric field signals Xi, Xq, Yi, and Yq are branched in the middle of the transmission line toward the reception processing circuit 20 and are then input to the transmission line monitoring device 3.

The transmission line monitoring device 3 is connected to the receiver 2 via, for example, an electric cable or an electric connector, and monitors the power distribution of the optical signal So on the transmission line 9 on the basis of the electric field signals Xi, Xq, Yi, and Yq input from the receiver 2. The transmission line monitoring device 3 may be incorporated in the receiver 2.

Exemplary Configuration of the Transmission Line Monitoring Device 3

Figure 2:
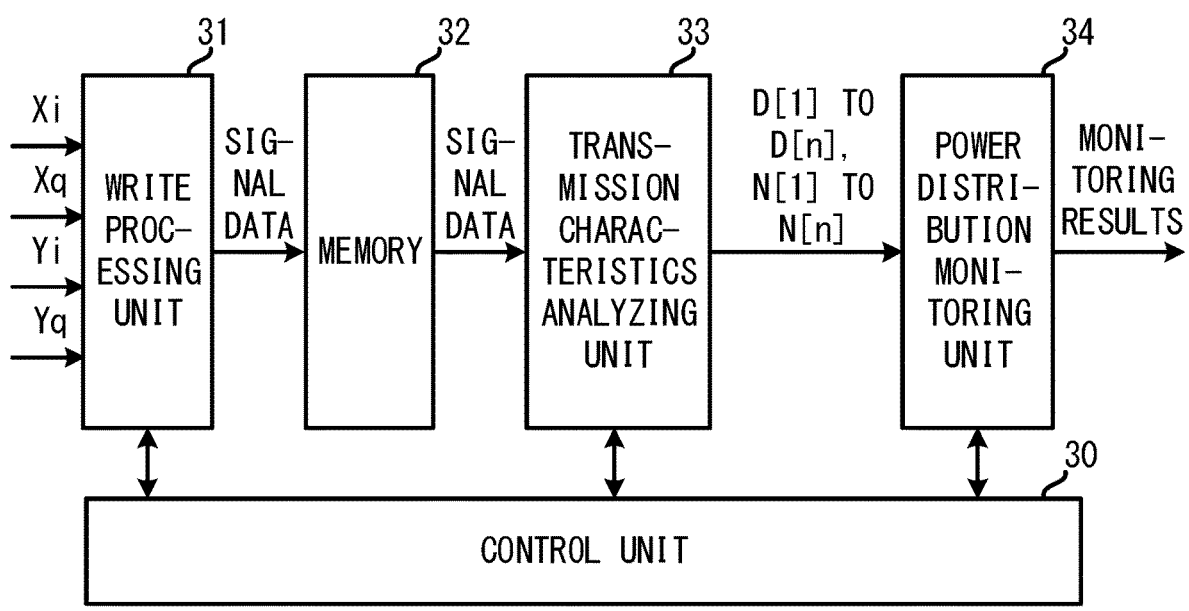
FIG. 2 is a block diagram illustrating an exemplary configuration of a transmission line monitoring device.

FIG. 2 is a block diagram illustrating an exemplary configuration of the transmission line monitoring device 3. The transmission line monitoring device 3 includes a control unit 30, a write processing unit 31, a memory 32, a transmission characteristics analyzing unit 33, and a power distribution monitoring unit 34. The write processing unit 31, the control unit 30, the transmission characteristics analyzing unit 33, and the power distribution monitoring unit 34 are configured by hardware such as an FPGA or an ASIC, software functions driving a processor such as a central processing unit (CPU), or a combination of hardware and software.

The electric field signals Xi, Xq, Yi, and Yq are input to the write processing unit 31 from the ADCs 22a to 22d, respectively. The write processing unit 31 writes signal data of the electric field signals Xi, Xq, Yi, and Yq for the time necessary for monitoring the power distribution of the optical signal So in the memory 32. The memory 32 holds the signal data.

The transmission characteristics analyzing unit 33 reads the signal data of the electric field signals Xi, Xq, Yi, and Yq from the memory 32, and analyzes the characteristics of the transmission line 9 by compensating the electric field signals Xi, Xq, Yi, and Yq for the deterioration, i.e., the nonlinear distortion, of the optical signal So in the transmission line 9 caused by the chromatic dispersion and the nonlinear optical effect. The transmission characteristics analyzing unit 33 discretely approximates the transmission line 9 by a plurality of virtual sections, and compensates for the chromatic dispersion and the nonlinear distortion in each section. For example, the transmission characteristics analyzing unit 33 evenly divides the transmission line 9 into n sections, and performs compensation.

The transmission characteristics analyzing unit 33 sets compensation quantities D[1] to D[n] (n: positive integer) of the chromatic dispersion according to the respective lengths of the sections, and searches for respective nonlinear compensation quantities N[1] to N[n] for the sections when the quality of the electric field signals Xi, Xq, Yi, and Yq satisfies a predetermined condition. The transmission characteristics analyzing unit 22 outputs the compensation quantities D[1] to D[n] of the chromatic dispersion and the compensation quantities N[1] to N[n] of the nonlinear distortion to the power distribution monitoring unit 34. Here, [1] to [n] are identifiers for identifying the respective virtual sections of the transmission line 9.

The power distribution monitoring unit 34 monitors the power distribution of the optical signal So on the transmission line 9 using the relationships between the compensation quantities D[1] to D[n] of the chromatic dispersion and the compensation quantities N[1] to N[n] of the nonlinear distortion. The power distribution monitoring unit 34 outputs the monitoring results of the power distribution to, for example, another device. The power distribution monitoring unit 34 is an example of a monitoring unit.

The control unit 30 controls the write processing unit 31, the transmission characteristics analyzing unit 33, and the power distribution monitoring unit 34 to monitor the transmission line 9. For example, the control unit 30 performs various settings and operation instructions according to a predetermined sequence for the transmission characteristics analyzing unit 33 and the power distribution monitoring unit 34.

Figure 3:
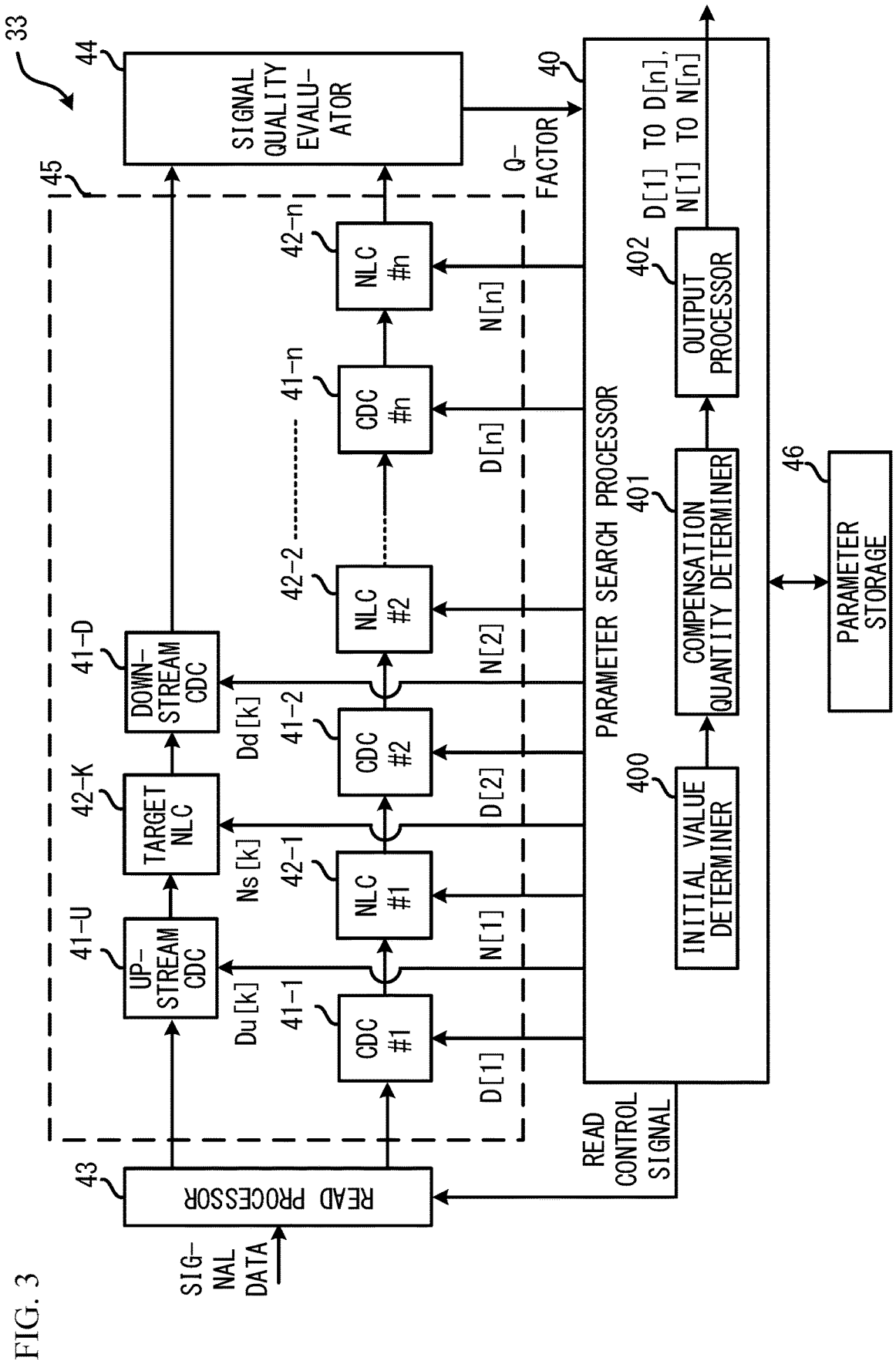
FIG. 3 is a block diagram illustrating an exemplary configuration of a transmission characteristics analyzing unit.

FIG. 3 is a block diagram illustrating an exemplary configuration of the transmission characteristics analyzing unit 33. The transmission characteristics analyzing unit 33 includes a parameter search processor 40, a read processor 43, a signal quality evaluator 44, a compensator 45, and a parameter storage 46.

The read processor 43 reads the signal data of the electric field signals Xi, Xq, Yi, and Yq from the memory 32. The read processor 43 outputs data to the compensator 45 according to a read control signal from the parameter search processor 40.

The compensator 45 alternately compensates the electric field signals Xi, Xq, Yi, and Yq for the chromatic dispersion and the nonlinear distortion produced in the optical signal So in each of the virtual sections that virtually divide the transmission line 9. The compensator 45 includes an upstream chromatic dispersion compensator (an upstream CDC) 41-U, a target nonlinear compensator (a target NLC) 42-K, and a downstream chromatic dispersion compensator (a downstream CDC) 41-D. The compensator 45 also includes a plurality of pairs of chromatic dispersion compensators (CDC #1 to CDC #n) 41-1 to 41-n and nonlinear compensators (NLC #1 to NLC #n) 42-1 to 42-n.

The upstream CDC 41-U, the downstream CDC 41-D, and the CDCs 41-1 to 41-n compensate for the chromatic dispersion produced in the optical signal So in each section of the transmission line 9. The upstream CDC 41-U, the downstream CDC 41-D, and the CDCs 41-1 to 41-n compensate for the chromatic dispersion by performing fast Fourier transform (FFT) of the signal data, filtering the result of the FFT using a frequency-domain filter, and then performing inverse FFT (IFFT).

The target NLC 42-K and the NLCs 42-1 to 42-n compensate for the nonlinear distortion produced in the optical signal So in each section of the transmission line 9. The nonlinear distortion is distortion caused in the optical signal So by the nonlinear optical effect such as self-phase modulation. The target NLC 42-K and the NLCs 42-1 to 42-n compensate for the nonlinear distortion by detecting the power of the optical signal So from the signal data, multiplying the detected power by a nonlinear compensation coefficient, and then adjusting the phase of the signal data according to the value obtained by the multiplication.

The upstream CDC 41-U, the target NLC 42-K, and the downstream CDC 41-D are connected in series with the data transmission line between the read processor 43 and the signal quality evaluator 44. The CDCs 41-1 to 41-n and the NLCs 42-1 to 42-n are alternately connected in series with another data transmission line between the read processor 43 and the signal quality evaluator 44.

The read processor 43 outputs the signal data of the electric field signals Xi, Xq, Yi, and Yq to the upstream CDC 41-U or the CDC 41-1, which is located most upstream in the corresponding transmission line, according to the read control signal from the parameter search processor 40. The above connection configuration of the compensator 45 represents the link relationships between the functional blocks when the compensator 45 is configured by software functions. The same applies to the description of the connection configuration hereafter.

The signal data input to the upstream CDC 41-U goes through the target NLC 42-K and the downstream CDC 41-D, and is then output to the signal quality evaluator 44. The signal data is compensated for the chromatic dispersion by the upstream CDC 41-U and the downstream CDC 41-D, and is compensated for the nonlinear distortion by the target NLC 42-K.

The signal data input to the CDC 41-1 alternately goes through the CDCs 41-2 to 41-n and the NLCs 42-1 to 42-n, and is then output to the signal quality evaluator 44. The signal data is compensated for the chromatic dispersion by the CDCs 41-1 to **41-*n*, and is compensated for the nonlinear distortion by the NLCs 42-1 to 42-*n***.

As described above, the compensator 45 compensates the electric field signals Xi, Xq, Yi, and Yq alternately for the chromatic dispersion and the nonlinear distortion. This allows more effective compensation than in the case where the chromatic dispersion or the nonlinear distortion is continuously compensated for.

The signal data output from the downstream CDC 41-D or the NLC **42-*n*, which is located most downstream, is input to the signal quality evaluator 44**.

The signal quality evaluator 44 is an example of an evaluation unit, and evaluates the quality of the electric field signals Xi, Xq, Yi, and Yq that are compensated for the chromatic dispersion and the nonlinear distortion by the compensator 45. The signal quality evaluator 44 calculates the Q-factor from the error rate of the signal data as an example of the quality of the electric field signals Xi, Xq, Yi, and Yq. The signal quality evaluator 44 outputs the Q-factor to the parameter search processor 40.

The parameter search processor 40 is an example of a search unit, and sets the compensation quantity of the chromatic dispersion (hereinafter, referred to as a "dispersion compensation quantity") to the compensator 45 according to the length of each section of the transmission line 9, and searches for the compensation quantity of the nonlinear distortion (hereinafter, referred to as a "nonlinear compensation quantity") of each section of the transmission line 9 when the qualities of the electric field signals Xi, Xq, Yi, and Yq satisfy predetermined conditions.

The parameter search processor 40 includes an initial value determiner 400, a compensation quantity determiner 401, and an output processor 402. The initial value determiner 400 determines the initial values of the nonlinear compensation quantities N[1] to N[n] of the NLCs 42-1 to **42-*n*. The initial value determiner 400 searches for the nonlinear compensation quantity Ns[k] (k=1, 2, ..., n) of the target NLC 42-K that makes the Q-factor maximum for each section of the transmission line 9 as the initial value. In this case, the initial value determiner 400 sets the dispersion compensation quantity Du[k] for the upstream side of a location within the search target section to the upstream CDC 41-U, and sets the dispersion compensation quantity Dd[k] for the downstream side of the location within the search target section to the downstream CDC 41**-D. The integer k is an identifier of the section.

The initial value determiner 400 stores the determined initial values in the parameter storage 46, and notifies the compensation quantity determiner 401 of the completion of the determination. The parameter storage 46 is a storage device such as, for example, a memory.

The compensation quantity determiner 401 sets the dispersion compensation quantities D[1] to D[n] for the respective sections of the transmission line 9 to the CDCs 41-2 to **41-*n*, respectively, searches for the nonlinear compensation quantities N[1] to N[n] of the NLCs 42-1 to 42-*n* for the respective sections of the transmission line 9, and stores the nonlinear compensation quantities N[1] to N[n] in the parameter storage 46. After determining the nonlinear compensation quantities N[1] to N[n] by search, the compensation quantity determiner 401 notifies the output processor 402** of the completion of the determination.

The output processor 402 reads the dispersion compensation quantities D[1] to D[n] of the CDCs 41-2 to **41-*n* and the nonlinear compensation quantities N[1] to N[n] of the NLCs 42-1 to 42-*n* from the parameter storage 46, and outputs them to the power distribution monitoring unit 34**.

The power distribution monitoring unit 34 monitors the power distribution of the optical signal So on the transmission line 9 on the basis of the relationships between the dispersion compensation quantities D[1] to D[n] and the nonlinear compensation quantities N[1] to N[n].

Next, the process by the parameter search processor 40 will be described.

Figure 4:
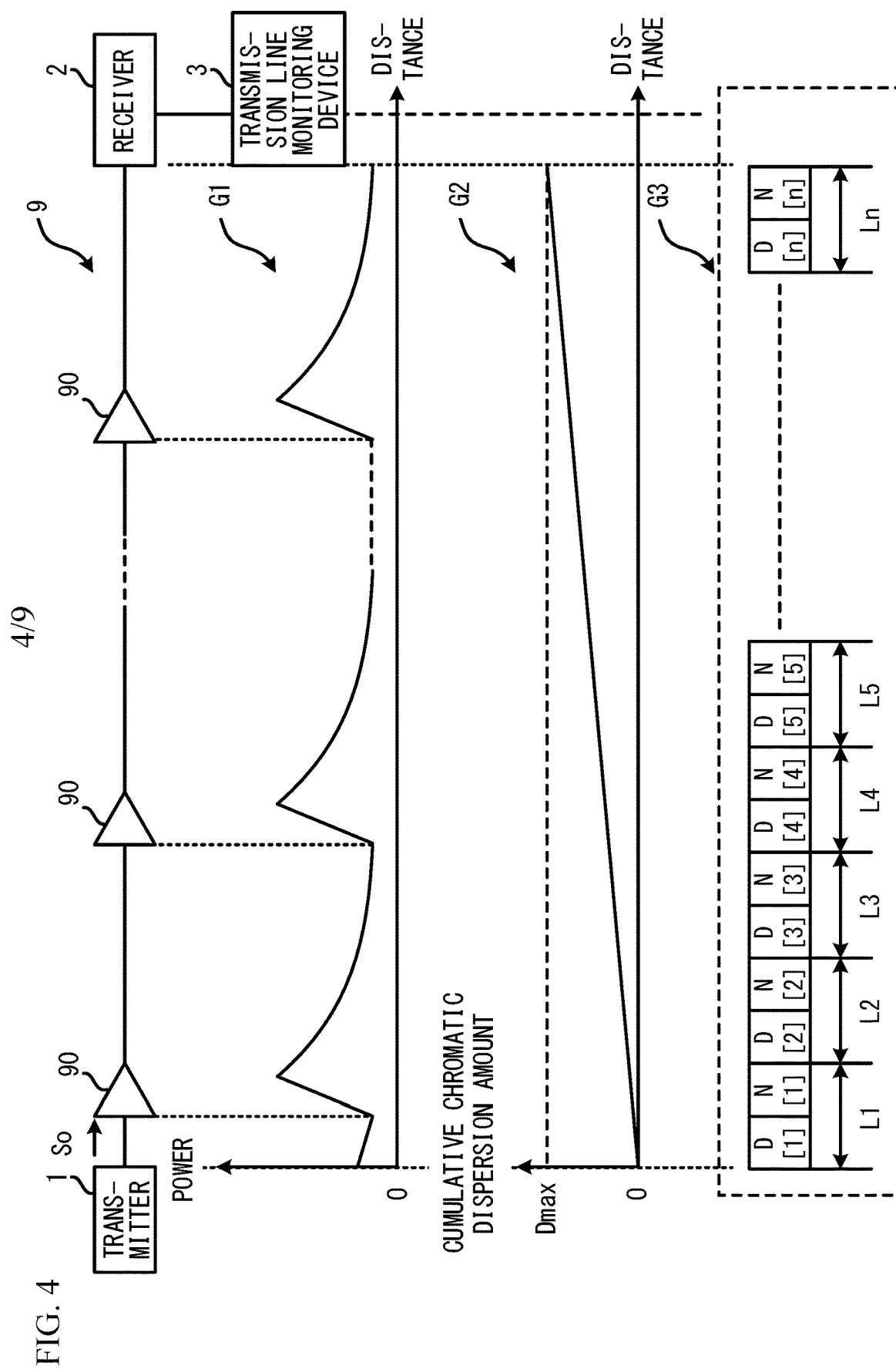
FIG. 4 illustrates a dispersion compensation quantity and a nonlinear compensation quantity for each section of a transmission line.

FIG. 4 illustrates the dispersion compensation quantities D[1] to D[n] and the nonlinear compensation quantities N[1] to N[n] for the respective sections L1 to Ln of the transmission line 9. In the uppermost part on the page of FIG. 4, the transmission line 9 connecting the transmitter 1 to the receiver 2 is illustrated, and optical amplifiers 90 that amplify the optical signal So are connected at intervals in the transmission line 9. In addition, the transmission line monitoring device 3 is connected to the receiver 2.

The reference letter G1 indicates an example of the power distribution of the optical signal So with respect to the distance (the location) of the transmission line 9. When the optical signal So undergoes the optical amplifier 90, the power of the optical signal So is amplified. Therefore, the power of the optical signal So is increased by the optical amplifier 90, and gradually decreases because of the transmission loss in the transmission line 9 without the optical amplifier 90.

The reference letter G2 indicates the cumulative chromatic dispersion amount of the optical signal So corresponding to the distance (the location) of the transmission line 9. The cumulative chromatic dispersion amount of the transmission line 9 is proportional to the distance from the transmitter 1.

The reference letter G3 indicates examples of the dispersion compensation quantities D[1] to D[n] and the nonlinear compensation quantities N[1] to N[n] for the respective sections L1 to Ln of the transmission line 9. The transmission line monitoring device 3 discretely approximates the transmission line 9 to treat the transmission line 9 as the virtual sections L1 to Ln. The sections L1 to Ln are set independently of the locations of the optical amplifiers 90.

The compensation quantity determiner 401 determines the dispersion compensation quantities D[1] to D[n] according to the respective lengths of the sections L1 to Ln by regarding the cumulative dispersion compensation quantity indicated by the reference letter G2 as the distance of the transmission line 9, and sets the determined dispersion compensation quantities D[1] to D[n] to the CDCs 41-1 to **41-*n*, respectively. In this case, the compensation quantity determiner 401 knows the respective lengths of the sections L1 to Ln in advance. The compensation quantity determiner 401 may determine the dispersion compensation quantities D[1] to D[n] according to the type of the optical fiber constructing the transmission line 9 in addition to the lengths of the sections L1 to Ln. As seen above, the compensation quantity determiner 401 determines the dispersion compensation quantities D[1] to D[n] precisely according to the parameters relating to the actual transmission line 9**.

After setting the dispersion compensation quantities D[1] to D[n] to the CDCs 41-1 to **41-*n*, respectively, the compensation quantity determiner 401** searches for the nonlinear compensation quantities N[1] to N[n] for the sections L1 to Ln that make the Q-factor of the electric field signals Xi, Xq, Yi, and Yq maximum, using, for example, the hill climbing method. The nonlinear optical effect is remarkable at the location where the power of the optical signal So is high, i.e., within the predetermined range from the output end of the optical amplifier 90. The compensation quantity determiner 401 also sets the dispersion compensation quantities D[1] to D[n] according to the lengths of the sections L1 to Ln, respectively.

Therefore, the compensation quantity determiner 401 allows the nonlinear compensation quantities N[1] to N[n] to be regarded as the power of the optical signal So in the respective sections L1 to Ln of the transmission line 9 by determining the nonlinear compensation quantities N[1] to N[n] for the sections L1 to Ln so that the quality of the electric field signals Xi, Xq, Yi, and Yq satisfies the predetermined condition. This allows the power distribution monitoring unit 34 to monitor the power distribution of the optical signal So on the transmission line 9 on the basis of the relationships between the dispersion compensation quantities D[1] to D[n] and the nonlinear compensation quantities N[1] to N[n] for the sections L1 to Ln. The dispersion compensation quantities D[1] to D[n] are examples of a first compensation quantity, and the nonlinear compensation quantities N[1] to N[n] are examples of a second compensation quantity.

This search is conducted by solving the optimization problem including the same number of variables as the number of the sections L1 to Ln of the transmission line 9, and there are many local optimum solutions. Therefore, use of the incorrect initial values different from the true optimum values makes it difficult to monitor the power distribution of the optical signal So precisely.

Thus, the initial value determiner 400 searches for the optimum initial values of the nonlinear compensation quantities N[1] to N[n] using the upstream CDC 41-U, the target NLC 42-K, and the downstream CDC 41-D prior to the search for the nonlinear compensation quantities N[1] to N[n]. The following describes the search for the initial values.

Figure 5:
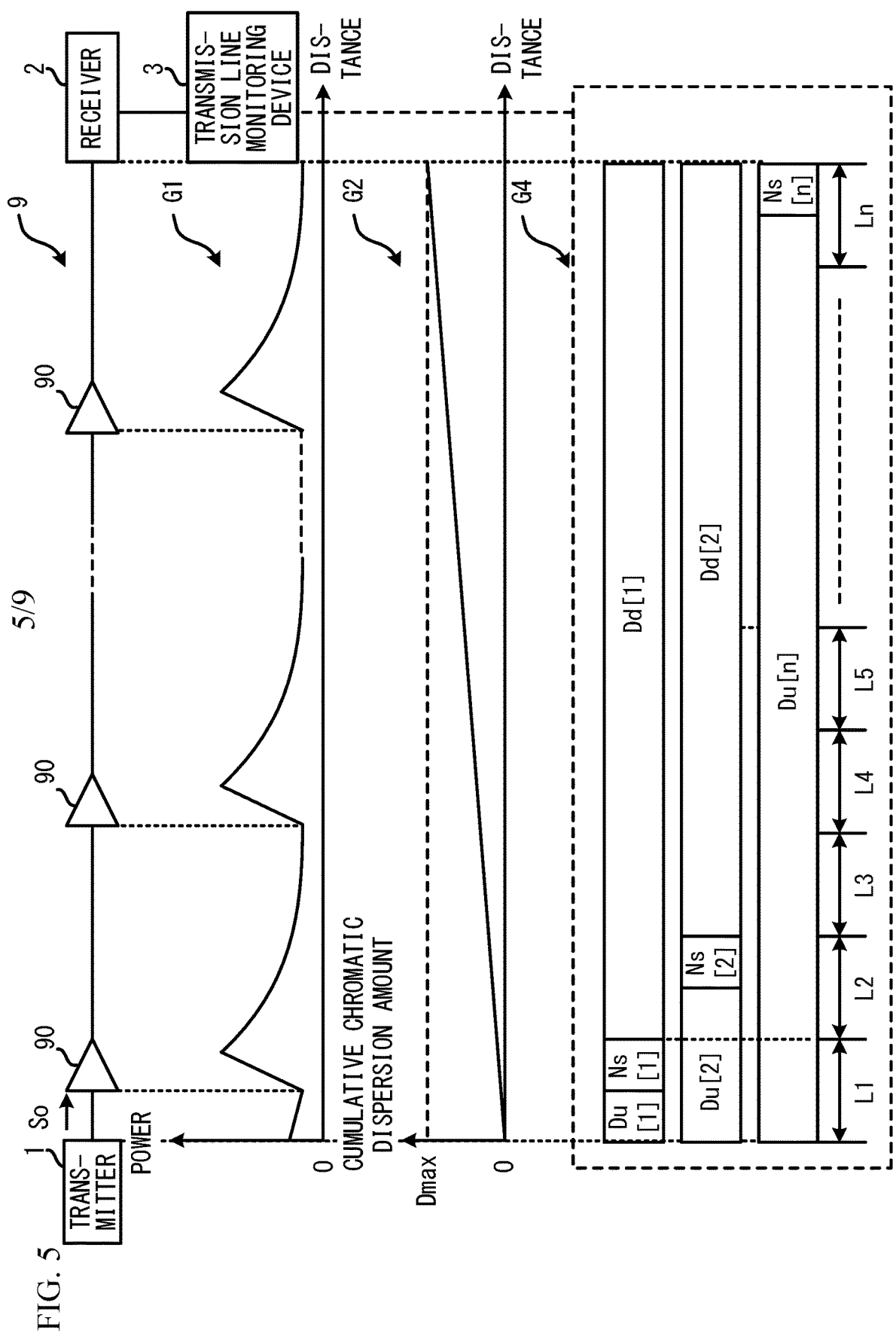
FIG. 5 illustrates a method of searching for the initial value of the nonlinear compensation quantity for each section of the transmission line.

FIG. 5 illustrates an exemplary method of searching for the initial values of the nonlinear compensation quantities N[1] to N[n] for the respective sections L1 to Ln of the transmission line 9. In FIG. 5, the same contents as those in FIG. 4 are indicated by the same reference numerals as those in FIG. 4, and the description thereof is omitted.

The initial value determiner 400 selects the sections L1 to Ln in sequence, and searches for the nonlinear compensation quantity Ns[k] for the selected section Lk (k=1 to n) as the initial value. The initial value determiner 400 sets the dispersion compensation quantity Du[k] for the upstream sections L1 to Lk of the selected section Lk to the upstream CDC 41-U and sets the dispersion compensation quantity Dd[k] for the downstream sections Lk to Ln of the selected section Lk to the downstream CDC 41-D.

For example, while selecting the L1 (k=1), the initial value determiner 400 sets the dispersion compensation quantity Du[1] for the upstream side of the location corresponding to the nonlinear compensation quantity Ns[1] within the section L1 to the upstream CDC 41-U, and sets the dispersion compensation quantity Dd[1] for the downstream side of the location corresponding to the nonlinear compensation quantity Ns[1] within the section L1 to the downstream CDC 41-D. The initial value determiner 400 calculates the dispersion compensation quantity Du[1] for the upstream side and the dispersion compensation quantity Dd[1] for the downstream side from the cumulative dispersion compensation quantity indicated by the reference letter G2.

After setting the dispersion compensation quantity Du[1] for the upstream side and the dispersion compensation quantity Dd[1] for the downstream side, the initial value determiner 400 searches for the nonlinear compensation quantity Ns[1] for the section L1 that makes the Q-factor maximum under the assumption that no nonlinear distortion is produced in the sections L2 to Ln other than the selected section L1.

Additionally, while selecting the section L2 (k=2), the initial value determiner 400 sets the dispersion compensation quantity Du[2] for the upstream side of the location corresponding to the nonlinear compensation quantity Ns[2] within the section L2 to the upstream CDC 41-U, and sets the dispersion compensation quantity Dd[2] for the downstream side of the location corresponding to the nonlinear compensation quantity Ns[2] within the section L2 to the downstream CDC 41-D. The initial value determiner 400 calculates the dispersion compensation quantity Du[2] for the upstream side and the dispersion compensation quantity Dd[2] for the downstream side from the cumulative dispersion compensation quantity indicated by the reference letter G2.

After setting the dispersion compensation quantity Du[2] for the upstream side and the dispersion compensation quantity Dd[2] for the downstream side, the initial value determiner 400 searches for the nonlinear compensation quantity Ns[2] for the section L2 that makes the Q-factor maximum, using the hill climbing method under the assumption that no nonlinear distortion is produced in the sections L1, L3 to Ln other than the selected section L2.

While selecting the section Ln (k=n), the initial value determiner 400 sets the dispersion compensation quantity Du[n] for the upstream side of the location corresponding to the nonlinear compensation quantity Ns[n] within the section Ln to the upstream CDC 41-U. However, there is no section where the chromatic dispersion is generated at the downstream side of the location corresponding to the nonlinear compensation quantity Ns[n] within the section Ln. Therefore, the initial value determiner 400 sets 0 to the downstream CDC 41-D as the dispersion compensation quantity Dd[n]. The initial value determiner 400 calculates the dispersion compensation quantity Du[n] for the upstream side from the cumulative dispersion compensation quantity indicated by the reference numeral G2.

After setting the dispersion compensation quantity Du[n] for the upstream side and the dispersion compensation quantity Dd[n] for the downstream side, the initial value determiner 400 searches for the nonlinear compensation quantity Ns[n] for the section Ln that makes the Q-factor maximum, using the hill climbing method under the assumption that no nonlinear distortion is produced in the sections L1 to Ln−1 other than the selected section Ln.

As seen above, the initial value determiner 400 searches for the nonlinear compensation quantity Ns[k] for the selected section when the quality of the electric field signals Xi, Xq, Yi, and Yq satisfies the predetermined condition under the assumption that no nonlinear distortion is produced in the sections other than the selected section Lk among the sections L1 to Ln. This search can be conducted easily and fast by solving the optimization problem including only one variable. The nonlinear compensation quantity Ns[k] is an example of a third compensation quantity.

The initial value determiner 400 searches for the nonlinear compensation quantities N[1] to N[n] of the NLCs 42-1 to 42-n using the nonlinear compensation quantities Ns[1] to Ns[n] for the respective sections L1 to Ln as the initial values. The nonlinear compensation quantities Ns[1] to Ns[n] can be used as the accurate initial values obtained by easy and fast search in consideration of the individual nonlinear distortions in the sections L1 to Ln. Therefore, the compensation quantity determiner 401 can search for the precise nonlinear compensation quantities N[1] to N[n] from the accurate initial values.

Thus, the power distribution monitoring unit 34 can monitor the power of the optical signal So on the transmission line 9 precisely.

In addition, the initial value determiner 400 divides the dispersion compensation quantity into the dispersion compensation quantity Du[k] for the upstream sections L1 to Lk of a location within the selected section Lk and the dispersion compensation quantity Dd[k] for the downstream sections Lk to Ln of the location within the selected section Lk, and sets the dispersion compensation quantity Du[k] to the upstream CDC 41-U and the dispersion compensation quantity Dd[k] to the downstream CDC 41-D. Thus, the initial value determiner 400 can calculate and set the dispersion compensation quantities Du[1] to Du[n] and Dd[1] to Dd[n] more easily than in the case where the dispersion compensation quantities D[1] to D[n] are individually calculated. The dispersion compensation quantities Du[1] to Du[n] are examples of a fourth compensation quantity and the dispersion compensation quantities Dd[1] to Dd[n] are examples of a fifth compensation quantity.

The compensation quantity determiner 401 uses the condition that the Q-factor of the electric field signals Xi, Xq, Yi, and Yq is maximum as the condition for the quality. This allows the compensation quantity determiner 401 to search for the nonlinear compensation quantities N[1] to N[n] and Ns[1] to Ns[n] for the respective sections L1 to Ln more precisely. The condition for the quality is not limited to the above condition, and the compensation quantity determiner 401 may use the condition that the Q-factor of the electric field signals Xi, Xq, Yi, and Yq is equal to or greater than a predetermine value as the condition for the quality.

Exemplary Method of Monitoring the Transmission Line

Next, a description will be given of the transmission line monitoring method conducted by the transmission line monitoring device 3.

Figure 6:
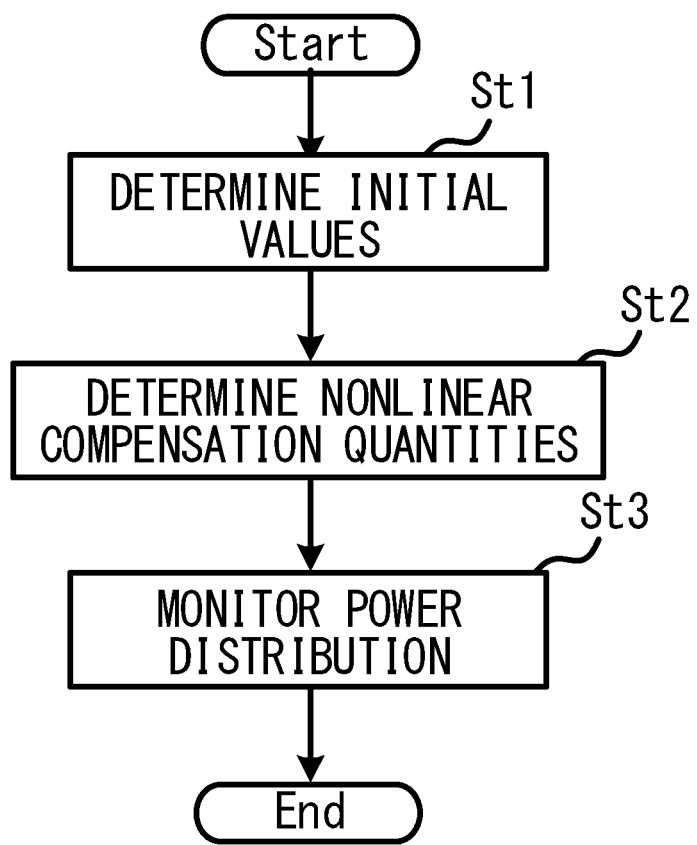
FIG. 6 is a flowchart illustrating a transmission line monitoring process.

FIG. 6 is a flowchart illustrating a transmission line monitoring process. The initial value determiner 400 searches for the nonlinear compensation quantities Ns[1] to Ns[n] as described above, and determines them as the initial values of the nonlinear compensation quantities N[1] to N[n] (step St1). The details of the process of determining the initial values will be described later.

The compensation quantity determiner 401 then searches for the nonlinear compensation quantities N[1] to N[n] using the nonlinear compensation quantities Ns[1] to Ns[n] as the initial values, and determines the nonlinear compensation quantities N[1] to N[n] (step St2). The details of the process of determining the nonlinear compensation quantities N[1] to N[n] will be described later.

Then, the power distribution monitoring unit 34 monitors the power distribution of the optical signal So on the basis of the relationships between the dispersion compensation quantities D[1] to D[n] and the nonlinear compensation quantities N[1] to N[n] (step St3). The power distribution monitoring unit 34 obtains the power distribution by regarding the dispersion compensation quantities D[1] to D[n] as the distances (the locations) on the transmission line 9 and regarding the nonlinear compensation quantities N[1] to N[n] as the power of the optical signal So. The transmission line monitoring process is executed as described above.

Figure 7:
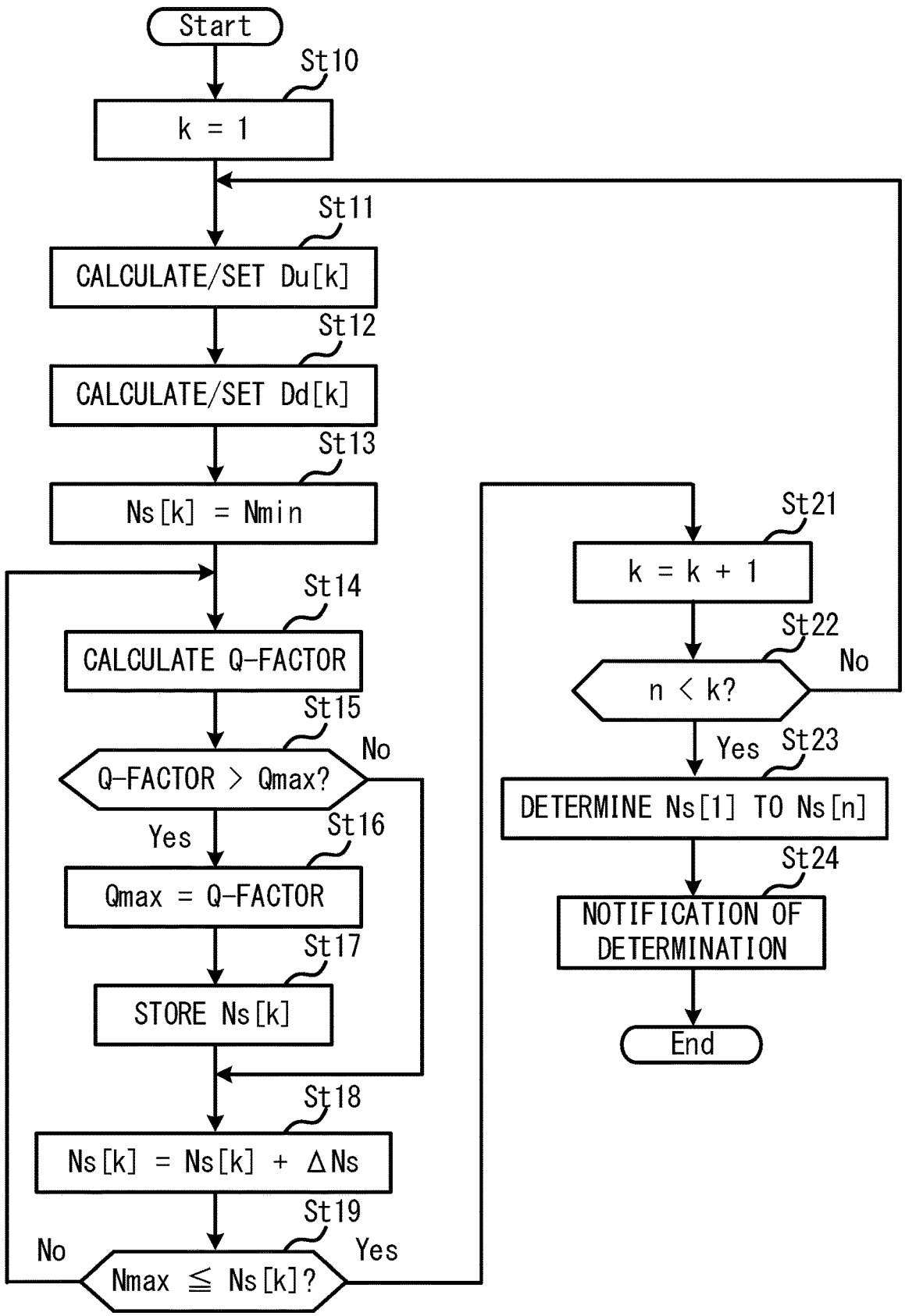
FIG. 7 is a flowchart illustrating a process of determining the initial value of the nonlinear compensation quantity.

FIG. 7 is a flowchart illustrating a process of determining the initial values of the nonlinear compensation quantities N[1] to N[n]. This process is executed in the above step St1. In this process, the initial value determiner 400 outputs a read control signal that causes the read processor 43 to output signal data to the upstream CDC 41-U.

The initial value determiner 400 sets k, which is the identifier for identifying each of the sections L1 to Ln of the transmission line 9, at "1" (step St10). This causes the initial value determiner 400 to select the section L1.

Then, the initial value determiner 400 calculates the dispersion compensation quantity Du[k] for the upstream side of a location within the selected section of the sections L1 to Ln according to the length of the selected section, and sets the calculated dispersion compensation quantity Du[k] to the upstream CDC 41-U (step St11). The initial value determiner 400 then calculates the dispersion compensation quantity Dd[k] for the downstream side of the location within the selected section of the sections L1 to Ln according to the length of the selected section, and sets the calculated dispersion compensation quantity Dd[k] to the downstream CDC 41-D (step St12).

As described above, the initial value determiner 400 divides the dispersion compensation quantity into the dispersion compensation quantity Du[k] for the upstream sections of the location within the selected section and the dispersion compensation quantity Dd[k] for the downstream sections of the location within the selected section, and sets them to the upstream CDC 41-U and the downstream CDC 41-D, respectively. Thereafter, the initial value determiner 400 searches for the nonlinear compensation quantity Ns[k] using, as an example, the hill climbing method. For example, the initial value determiner 400 increases the nonlinear compensation quantity Ns[k] from the minimum value Nmin to the maximum value Nmax in increments of ΔNs. The minimum value Nmin, the maximum value Nmax, and the step size ΔNs are set at appropriate values according to the characteristics of the transmission system.

The initial value determiner 400 sets the nonlinear compensation quantity Ns[k] at the minimum value Nmin, and sets the nonlinear compensation quantity Ns[k] to the target NLC 42-K (step St13). Then, the signal quality evaluator 44 calculates the Q-factor (step St14). The initial value determiner 400 compares the Q-factor with the maximum value Qmax (step St15). The maximum value Qmax is determined in advance according to, for example, the error characteristics of the transmission line 9, and is stored in the parameter storage 46.

When the Q-factor is greater than the maximum value Qmax (Yes in step St15), the initial value determiner 400 replaces the maximum value Qmax in the parameter storage 46 by the calculated Q-factor (step St16). This updates the maximum value Qmax to a larger Q-factor, and eventually, the maximum value within the search range is stored in the parameter storage 46.

Then, the initial value determiner 400 stores the nonlinear compensation quantity Ns[k] in the parameter storage 46 (step St17). Therefore, the nonlinear compensation quantity Ns[k] when the Q-factor is maximum is stored in the parameter storage 46 consequently.

When the Q-factor is equal to or less than the maximum value Qmax (No in step St15), the initial value determiner 400 executes none of processes in steps St16 and St17. Thus, the maximum value Qmax is not updated.

Then, the initial value determiner 400 adds the step size ΔNs to the nonlinear compensation quantity Ns[k] (Ns[k]=Ns[k]+ΔNs), and sets the new nonlinear compensation quantity Ns[k] to the target NLC 42-K (step St18). Then, the initial value determiner 400 compares the set nonlinear compensation quantity Ns[k] with the maximum value Nmax (step St19).

When the nonlinear compensation quantity Ns[k] is less than the maximum value Nmax (No in step St19), the processes in and after step St14 are executed. When the nonlinear compensation quantity Ns[k] is equal to or greater than the maximum value Nmax (Yes in step St19), the initial value determiner 400 recognizes that the search for the nonlinear compensation quantity Ns[k] is completed.

Then, the initial value determiner 400 adds 1 to k (k=k+1) to search for the nonlinear compensation quantity Ns[k] for the next section (step St21). This allows the initial value determiner 400 to search for the nonlinear compensation quantity Ns[k] for the next section Lk under the assumption that no nonlinear distortion is produced in the other sections.

The initial value determiner 400 then compares k with n (step St22). When k is greater than n (Yes in step St22), the initial value determiner 400 recognizes that the nonlinear compensation quantity Ns[k] has been searched for, for all the sections L1 to Ln and determines the nonlinear compensation quantities Ns[1] to Ns[n] stored in the parameter storage 46 as the initial values (step St23). Then, the initial value determiner 400 notifies the compensation quantity determiner 401 of the determination of the initial values (step St24). This causes the compensation quantity determiner 401 to execute the process of determining the nonlinear compensation quantities N[1] to N[n].

When k is equal to or less than n (No in step St22), the initial value determiner 400 executes the processes in and after step St11 again to search for the nonlinear compensation quantity Ns[k] in the next section Lk. The process of determining the initial values is executed as described above.

As seen above, the initial value determiner 400 selects the sections L1 to Ln in sequence, and sets the dispersion compensation quantities Du[k] and Dd[k] to the upstream CDC 41-U and the downstream CDC 41-D, respectively. The initial value determiner 400 searches for the nonlinear compensation quantity Ns[k] for the selected section Lk when the Q-factor of the electric field signals Xi, Xq, Yi, and Yq is maximum under the assumption that no nonlinear distortion is produced in the sections other than the selected section Lk.

Thus, it is possible to use the nonlinear compensation quantities Ns[1] to Ns[n] as the accurate initial values obtained through easy and fast search in consideration of the individual nonlinear distortions in the sections L1 to Ln.

The initial value determiner 400 increases the nonlinear compensation quantity Ns[k] for the selected section Lk from the minimum value Nmin to the maximum value Nmax in increments of a predetermined amount ΔNs. The initial value determiner 400 searches for the nonlinear compensation quantity Ns[k] for the selected section Lk by determining whether the Q-factor has increased or decreased, every time when the nonlinear compensation quantity Ns[k] is increased.

Thus, the initial value determiner 400 can easily determine the nonlinear compensation quantity Ns[k] that makes the Q-factor maximum by unilaterally increasing the nonlinear compensation quantity Ns[k].

Figure 8:
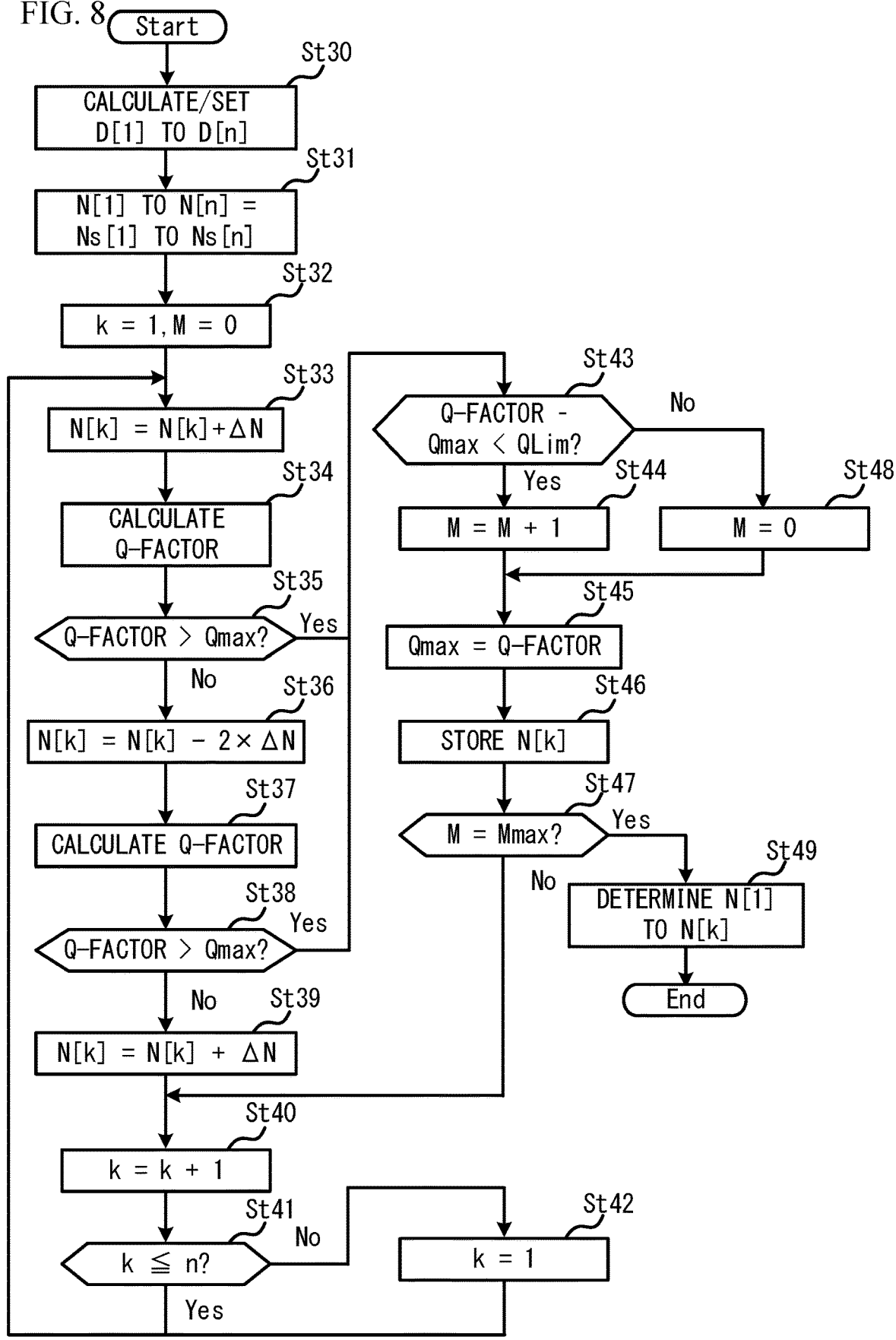
FIG. 8 is a flowchart illustrating a process of determining the nonlinear compensation quantity.

FIG. 8 is a flowchart illustrating a process of determining the nonlinear compensation quantities N[1] to N[n]. This process is executed after the process of determining the initial values is completed.

The compensation quantity determiner 401 calculates the dispersion compensation quantities D[1] to D[n] for the respective sections L1 to Ln according to the lengths of the sections L1 to Ln, and sets the calculated dispersion compensation quantities D[1] to D[n] to the CDCs 41-1 to 41-n, respectively (step St30). Then, the compensation quantity determiner 401 reads the nonlinear compensation quantities Ns[1] to Ns[n], which are the initial values determined through the process of determining the initial values, from the parameter storage 46, and sets them to the NLCs 42-1 to 42-n as the initial values of the nonlinear compensation quantities N[1] to N[n], respectively (step St31).

As seen above, in the process of determining the nonlinear compensation quantity N[k], unlike the process of determining the initial values in which the nonlinear compensation quantity Ns[k] is set only to the target NLC 42-K of the specific section Lk, the nonlinear compensation quantities N[1] to N[n] are set to the NLCs 42-1 to 42-n for the sections L1 to Ln, respectively.

Then, the compensation quantity determiner 401 sets k, which is the identifier for identifying each of the sections L1 to Ln, at 1, and sets the number M, which indicates the number of times the variation in the Q-factor is lower than the lower limit, at 0 (step St32). Then, the compensation quantity determiner 401 increments the nonlinear compensation quantity N[k] for the section Lk by a step size ΔN (>0), and sets the resulting nonlinear compensation quantity N[k] to the NLC 42-k (step St33). The signal quality evaluator 44 then calculates the Q-factor from the signal data of which the chromatic dispersion and the nonlinear distortion are compensated (step St34).

Then, the compensation quantity determiner 401 compares the Q-factor with the maximum value Qmax (step St35). When the Q-factor is equal to or less than the maximum value Qmax (No in step St35), the compensation quantity determiner 401 decreases the nonlinear compensation quantity N[k] by (2×ΔN), and sets the resulting nonlinear compensation quantity N[k] to the NLC 42-k (step St36). Then, the signal quality evaluator 44 calculates the Q-factor from the signal data of which the chromatic dispersion and the nonlinear distortion are compensated (step St37).

Then, the compensation quantity determiner 401 compares the Q-factor with the maximum value Qmax (step St38). When the Q-factor is equal to or less than the maximum value Qmax (No in step St38), the compensation quantity determiner 401 increments the nonlinear compensation quantity N[k] by a step size ΔN, and sets the resulting nonlinear compensation quantity N[k] to the NLC 42-k (step St39). This process causes the nonlinear compensation quantity N[k] to return to the initial value.

When the Q-factor is greater than the maximum value Qmax (Yes in step St35, Yes in step St38), the compensation quantity determiner 401 compares the increment in the Q-factor (Q-factor−Qmax) with the lower limit QLim (step St43). Through this process, the compensation quantity determiner 401 determines whether the increment in the Q-factor due to the variation in the nonlinear compensation quantity N[k] reaches a limit, i.e., whether the Q-factor is close to the peak. Note that appropriate values are set to the maximum value Qmax and the lower limit QLim according to the characteristics of the transmission system.

When (Q-factor−Qmax) is less than the lower limit QLim (Yes in step St43), the compensation quantity determiner 401 adds 1 to the number M (step St44). When (Q-factor−Qmax) is equal to or greater than the lower limit QLim (No in step St43), the compensation quantity determiner 401 returns the number M to 0 (step St48).

Then, the compensation quantity determiner 401 stores the Q-factor in the parameter storage 46 as the maximum value Qmax (step St45). This updates the maximum value Qmax to a larger Q-factor, and eventually the maximum value within the search range is stored in the parameter storage 46. Then, the compensation quantity determiner 401 stores the nonlinear compensation quantity N[k] when the Q-factor is greater than the maximum value Qmax in the parameter storage 46 (step St46).

The compensation quantity determiner 401 then compares the number M, which indicates the number of times the increment in the Q-factor is lower than the lower limit QLim, with the maximum number Mmax (step St47). When the number M reaches the maximum number Mmax (Yes in step St47), the compensation quantity determiner 401 determines the nonlinear compensation quantities N[1] to N[n] for monitoring the power distribution of the optical signal So (step St49). When the number M has not reached the maximum number Mmax (No in step St47), the compensation quantity determiner 401 executes the process in step St40 described later.

As seen above, the compensation quantity determiner 401 searches for the nonlinear compensation quantity N[k] that makes the Q-factor maximum by increasing or decreasing the nonlinear compensation quantity N[k]. The compensation quantity determiner 401 determines whether the Q-factor has increased or decreased every time when the nonlinear compensation quantity N[k] is varied, and terminates the search for the nonlinear compensation quantity N[k] when the increment in the Q-factor is lower than the lower limit QLim the maximum number Mmax of times consecutively.

Thus, the compensation quantity determiner 401 can precisely search for the nonlinear compensation quantity N[k] that makes the Q-factor maximum.

Then, the compensation quantity determiner 401 adds 1 to k (step St40), and compares the resulting k with n that is the number of the sections L1 to Ln (step St41). When k is greater than n (No in step St41), the compensation quantity determiner 401 returns k to 1 (step St42). When k is equal to or less than n (Yes in step St41), the compensation quantity determiner 401 executes the processes in and after step St33 again. The process of determining the nonlinear compensation quantity N[k] is executed as described above. The processes in the flowcharts illustrated in FIG. 7 and FIG. 8 may be executed by hardware or software, or may be executed by combination of hardware and software.

Another Example of the Transmission Characteristics Analyzing Unit 33

Figure 9:
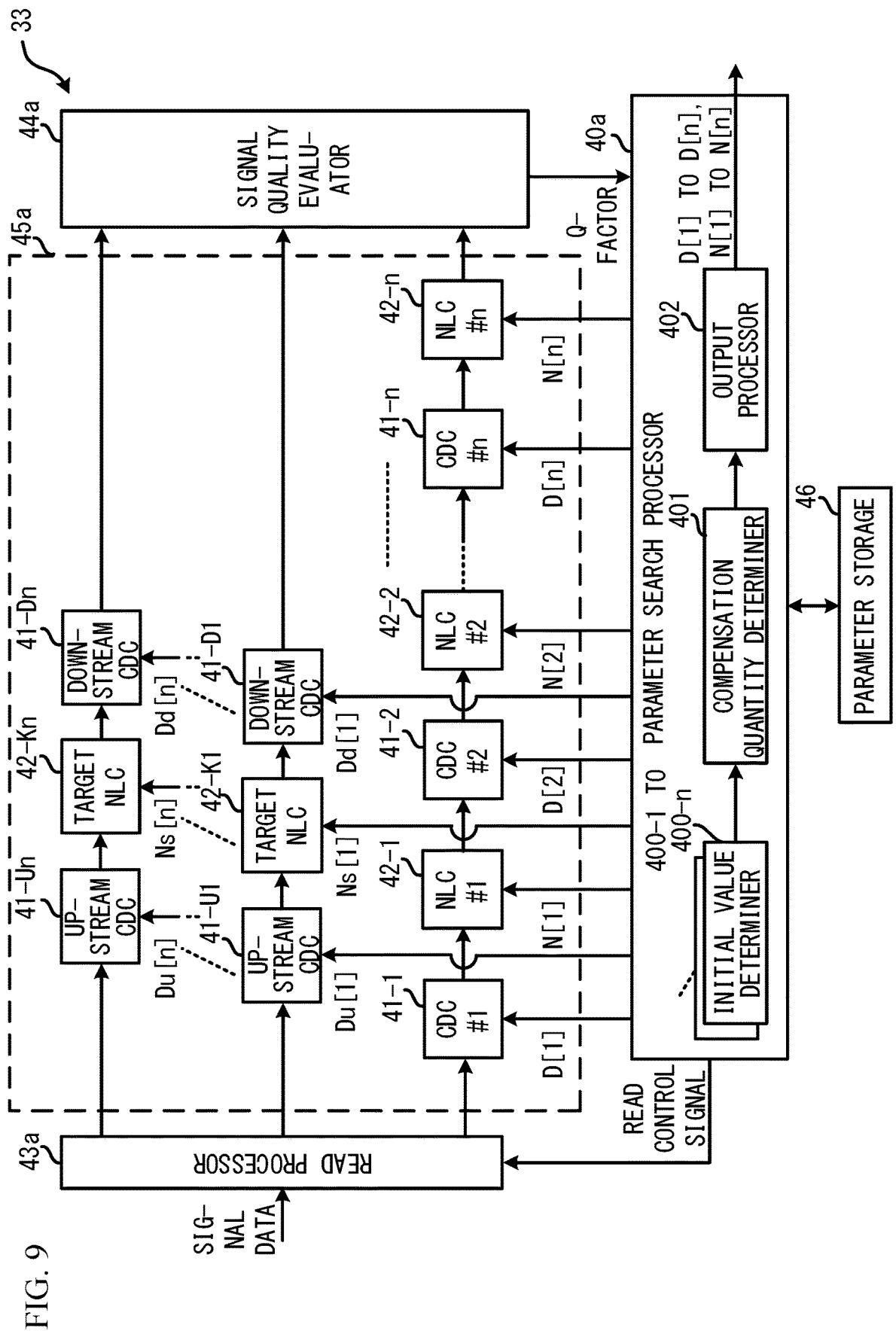
FIG. 9 is a block diagram illustrating another exemplary configuration of the transmission characteristics analyzing unit.

FIG. 9 is a block diagram illustrating another exemplary configuration of the transmission characteristics analyzing unit 33. In FIG. 9, the components common to those in FIG. 3 are indicated by the same reference numerals as those in FIG. 3, and the description thereof is omitted.

The transmission characteristics analyzing unit 33 searches for the initial values of the nonlinear compensation quantities N[k] for the respective sections L1 to Ln of the transmission line 9 in parallel. The transmission characteristics analyzing unit 33 includes a parameter search processor 40*a*, a read processor 43*a*, a signal quality evaluator 44*a*, a compensator 45*a*, and the parameter storage 46.

The parameter search processor 40*a* includes initial value determiners 400-1 to 400-*n* for the respective sections L1 to Ln of the transmission line 9, the compensation quantity determiner 401, and the output processor 402. The compensator 45*a* includes n pairs of the CDCs 41-1 to 41-*n* and the NLCs 42-1 to 42-*n*, upstream CDCs 41-U1 to 41-Un, target NLCs 42-K1 to 42-Kn, and downstream CDCs 41-D1 to 41-Dn. The number of the upstream CDCs 41-U1 to 41-Un, the number of the target NLCs 42-K1 to 42-Kn, and the number of the downstream CDCs 41-D1 to 41-Dn correspond to the number of the section L1 to Ln of the transmission line 9.

The initial value determiner 400-*k* for each section Lk determines the nonlinear compensation quantity Ns[k] using the upstream CDC 41-Uk, the target NLC 42-Kk, and the downstream CDC 41-Dk as in the process of determining the initial values illustrated in FIG. 7. In this case, the initial value determiners 400-1 to 400-*n* simultaneously execute the process of determining the initial value in parallel. Thus, the nonlinear compensation quantities Ns[1] to Ns[n] for the sections L1 to Ln can be obtained practically simultaneously.

The read processor 43*a* outputs signal data to the upstream CDCs 41-U1 to 41-Un according to read control signals from the initial value determiners 400-1 to 400-*n*. The signal quality evaluator 44*a* calculates the Q-factor from the compensated signal data input from the upstream CDCs 41-U1 to 41-Un, the target NLCs 42-K1 to 42-Kn, and the downstream CDCs 41-D1 to 41-Dn for the respective sections L1 to Ln, and outputs the Q-factor to the parameter search processor 40*a*.

As described above, the parameter search processor 40*a* searches for the nonlinear compensation quantities Ns[1] to Ns[n] for the sections L1 to Ln in parallel. Thus, the time required for determining the initial values becomes less than in the case where the nonlinear compensation quantities Ns[1] to Ns[n] are searched for one by one.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A transmission line monitoring device comprising:
   a memory; and
   a processor coupled to the memory and configured to:
   compensate an electric field signal alternately for a chromatic dispersion and a nonlinear distortion produced in an optical signal in each of virtual sections, the electric field signal indicating an optical electric field component of the optical signal input from a transmission line virtually divided into the virtual sections;
   evaluate a quality of the electric field signal that is compensated for the chromatic dispersion and the nonlinear distortion;
   set a first compensation quantity of the chromatic dispersion according to a length of each of the virtual sections to search for a second compensation quantity of the nonlinear distortion for each of the virtual sections when the quality satisfies a predetermined condition; and
   monitor a power distribution of the optical signal on the transmission line on a basis of a relationship between the first compensation quantity and the second compensation quantity, wherein the processor is further configured to, when searching for the second compensation quantity,
select the virtual sections in sequence,
set the first compensation quantity, and
search for a third compensation quantity of the nonlinear distortion for a selected virtual section when the quality satisfies the predetermined condition under an assumption that no nonlinear distortion is produced in virtual sections other than the selected virtual section out of the virtual sections, and
search for the second compensation quantity for each of the selected virtual section by setting an initial value of the second compensation quantity to the third compensation quantity.

2. The transmission line monitoring device according to claim 1, wherein the predetermined condition for the quality is that a Q-factor of the electric field signal is maximum.

3. The transmission line monitoring device according to claim 1, wherein the processor is further configured to, when searching for the third compensation quantity, search for the third compensation quantity for each of the virtual sections in parallel.

4. The transmission line monitoring device according to claim 1, wherein the processor is further configured to, when searching for the third compensation quantity, search for the third compensation quantity by dividing the first compensation quantity into a fourth compensation quantity for virtual sections upstream of a location within the selected virtual section and a fifth compensation quantity for virtual sections downstream of the location within the selected virtual section, and setting the fourth compensation quantity and the fifth compensation quantity.

5. The transmission line monitoring device according to claim 1, wherein the processor is further configured to, when searching for the second compensation quantity,
search for the second compensation quantity by varying a compensation quantity of the nonlinear distortion for each of the virtual sections,
determine whether the quality has increased or decreased every time when the compensation quantity of the nonlinear distortion is varied, and
terminate searching for the second compensation quantity when an increment in the quality is lower than a lower limit a predetermined number of times consecutively.

6. The transmission line monitoring device according to claim 1, wherein the processor is configured to, when searching for the third compensation quantity, increase a compensation quantity of the nonlinear distortion for the selected virtual section from a minimum value to a maximum value in increments of a predetermined amount, and search for the third compensation quantity for the selected virtual section by determining whether the quality has increased or decreased every time when the compensation quantity of the nonlinear distortion is increased.

7. A transmission line monitoring method comprising:
compensating an electric field signal alternately for a chromatic dispersion and a nonlinear distortion produced in an optical signal in each of virtual sections, the electric field signal indicating an optical electric field component of the optical signal input from a transmission line virtually divided into the virtual sections;
evaluating a quality of the electric field signal that is compensated for the chromatic dispersion and the nonlinear distortion;
setting a first compensation quantity of the chromatic dispersion according to a length of each of the virtual sections and searching for a second compensation quantity of the nonlinear distortion for each of the virtual sections when the quality satisfies a predetermined condition; and
monitoring a power distribution of the optical signal on the transmission line on a basis of a relationship between the first compensation quantity and the second compensation quantity,
wherein the searching of the second compensation quantity includes:
selecting the virtual sections in sequence,
setting the first compensation quantity, and
searching for a third compensation quantity of the nonlinear distortion for a selected virtual section when the quality satisfies the predetermined condition under an assumption that no nonlinear distortion is produced in virtual sections other than the selected virtual section out of the virtual sections, and
searching for the second compensation quantity by setting an initial value of the second compensation quantity to the third compensation quantity.

8. The transmission line monitoring method according to claim 7, wherein the predetermined condition for the quality is that a Q-factor of the electric field signal is a maximum value.

9. The transmission line monitoring method according to claim 7, wherein the searching of the third compensation quantity for each of the virtual sections includes searching for the third compensation quantity for each of the virtual sections in parallel.

10. The transmission line monitoring method according to claim 7, wherein the searching of the third compensation quantity includes searching for the third compensation quantity by dividing the first compensation quantity into a fourth compensation quantity for virtual sections upstream of a location within the selected virtual section and a fifth compensation quantity for virtual sections downstream of the location within the selected virtual section, and setting the fourth compensation quantity and the fifth compensation quantity.

11. The transmission line monitoring method according to claim 7, wherein the searching of the second compensation quantity includes:
searching for the second compensation quantity by varying a compensation quantity of the nonlinear distortion for each of the virtual sections,
determining whether the quality has increased or decreased every time when the compensation quantity of the nonlinear distortion is varied, and
terminating searching for the second compensation quantity when an increment in the quality is lower than a lower limit a predetermined number of times consecutively.

12. The transmission line monitoring method according to claim 7, wherein the searching of the third compensation quantity for the selected virtual section includes increasing a compensation quantity of the nonlinear distortion for the selected virtual section from a minimum value to a maximum value in increments of a predetermined amount, and searching for the third compensation quantity for the selected virtual section by determining whether the quality has increased or decreased every time when the compensation quantity of the nonlinear distortion is increased.

* * * * *